(12) United States Patent
Wu

(10) Patent No.: US 10,049,643 B1
(45) Date of Patent: Aug. 14, 2018

(54) IMAGE PROCESSING APPARATUS AND METHOD FOR CORRECTING COLOR SHIFT IN DISPLAYED IMAGE

(71) Applicants: BOE TECHNOLOGY GROUP CO., LTD., Beijing (CN); PEKING UNIVERSITY, Beijing (CN)

(72) Inventor: Yanbing Wu, Beijing (CN)

(73) Assignees: BOE TECHNOLOGY GROUP CO., LTD., Beijing (CN); PEKING UNIVERISTY, Beijing (CN)

( * ) Notice: Subject to any disclaimer, the term of this patent is extended or adjusted under 35 U.S.C. 154(b) by 0 days.

(21) Appl. No.: 15/548,066

(22) PCT Filed: Nov. 23, 2016

(86) PCT No.: PCT/CN2016/106846
§ 371 (c)(1),
(2) Date: Aug. 1, 2017

(87) PCT Pub. No.: WO2018/000700
PCT Pub. Date: Jan. 4, 2018

(30) Foreign Application Priority Data

Jun. 30, 2016 (CN) .......................... 2016 1 0514139

(51) Int. Cl.
*G09G 5/02* (2006.01)
*G09G 3/20* (2006.01)
(Continued)

(52) U.S. Cl.
CPC .............. *G09G 5/026* (2013.01); *G06T 1/20* (2013.01); *G09G 3/2003* (2013.01);
(Continued)

(58) Field of Classification Search
None
See application file for complete search history.

(56) References Cited

U.S. PATENT DOCUMENTS

2010/0225663 A1 9/2010 Lee et al.
2013/0033517 A1 2/2013 Choi et al.

FOREIGN PATENT DOCUMENTS

CN 102136255 A 7/2011
CN 102915721 A 2/2013
(Continued)

OTHER PUBLICATIONS

International Search Report & Written Opinion dated Apr. 6, 2017 regarding PCT/CN2016/106846.

*Primary Examiner* — Michelle Chin
(74) *Attorney, Agent, or Firm* — Intellectual Valley Law, P.C.

(57) ABSTRACT

The present application discloses an image processing apparatus for correcting color-shift in a displayed image due to brightness change of blue sub-pixels of a display panel with an added a blue-light filter configured to filter blue light. The image processing apparatus includes a cache memory configured to store a cache image comprising initial grayscale levels corresponding to respective brightness of a plurality of subpixels in a pixel at a current time; a grayscale level corrector configured to generate a set of N corrected grayscale levels of brightness of a blue sub-pixel for a correction scheme; and an image processor coupled respectively to the cache memory and the grayscale level corrector, and configured to reset an initial grayscale level of at least one sub-pixel in the pixel to a reset grayscale level, and to output a grayscale voltage based on the reset grayscale level for driving the at least one sub-pixel of the pixel in the display panel for displaying a corrected image.

20 Claims, 4 Drawing Sheets

(51) Int. Cl.
  *G09G 3/36* (2006.01)
  *G06T 1/20* (2006.01)
  *H04N 9/64* (2006.01)

(52) U.S. Cl.
  CPC ............. *G09G 3/3607* (2013.01); *H04N 9/64* (2013.01); *G09G 2320/0666* (2013.01)

(56) References Cited

FOREIGN PATENT DOCUMENTS

| | | |
|---|---|---|
| CN | 104505054 A | 4/2015 |
| CN | 105513559 A | 4/2016 |

IMAGE PROCESSING APPARATUS AND METHOD FOR CORRECTING COLOR SHIFT IN DISPLAYED IMAGE

CROSS-REFERENCE TO RELATED APPLICATION

This application is a national stage application under 35 U.S.C. § 371 of International Application No. PCT/CN2016/106846 filed Nov. 23, 2016, which claims priority to Chinese Patent Application No. 201610514139.7, filed Jun. 30, 2016, the contents of which are incorporated by reference in the entirety.

TECHNICAL FIELD

The present invention relates to the field of image processing, in particular, to an image processing apparatus and a method for correcting color shift in a displayed image, a method for controlling the image processing apparatus, and a display apparatus.

BACKGROUND

In a liquid crystal display apparatus, the display panel includes multiple pixels arranged in multiple matrix arrays. Each pixel includes several sub-pixels respectively for displaying different colors, such as red, green, and blue. The brightness of each sub-pixel in each pixel is determined by both an emitted light intensity from a backlight module of the liquid crystal display apparatus and a grayscale level of this sub-pixel. Different colors can be generated at different pixels through mixing the light from three sub-pixels respectively controlled at different brightness. In a conventional method of driving the liquid crystal display apparatus, the liquid crystal molecules associated with different sub-pixels in the display panel are rotated to different angles driven by different values of a grayscale voltage to achieve different grayscale levels in brightness for displaying different color and brightness for each pixel.

During an actual image display operation using the liquid crystal display apparatus, it is often occurred that the brightness of one colored sub-pixel of a pixel may be lowered for some reason. For example, in a display apparatus having a blue-light preventer, a thin-film filter absorbs blue light of certain wavelengths emitted from the display panel to make the brightness of blue sub-pixels lowered to a level below a theoretical level of assuming no blue-light preventer. Because of brightness reduction of a certain-colored sub-pixel in a pixel, a color shift problem will occur in the displayed image. For example, the display image of a display apparatus having blue-light preventer usually looks like yellowish. The color shift problem of the display apparatus reduces effective viewing quality of the display apparatus.

SUMMARY

In one aspect, the present disclosure provides an image processing apparatus for correcting color-shift in a displayed image due to brightness change of blue sub-pixels of a display panel with an added a blue-light filter configured to filter blue light, the image processing apparatus comprising a cache memory configured to store a cache image comprising initial grayscale levels corresponding to respective brightness of a plurality of subpixels in a pixel at a current time; a grayscale level corrector configured to generate a set of N corrected grayscale levels of brightness of a blue sub-pixel for a correction scheme, the set of N corrected grayscale levels respectively one-to-one corresponding to a set of N original grayscale levels from a minimum 0 sequentially up to a maximum N−1 of the blue sub-pixel of the display panel without the added blue-light filter; and an image processor coupled respectively to the cache memory and the grayscale level corrector, and configured to reset an initial grayscale level of at least one sub-pixel in the pixel to a reset grayscale level, and to output a grayscale voltage based on the reset grayscale level for driving the at least one sub-pixel of the pixel in the display panel for displaying a corrected image.

Optionally, the image processor is configured to process at least a portion of the cache image to calculate an average grayscale value of the initial grayscale levels of the blue sub-pixels in the at least a portion, and to reset an initial grayscale level of each sub-pixel other than the blue sub-pixel in the pixel in the at least a portion based on the correction scheme when the average grayscale value is greater than a threshold value, and to output the grayscale voltage for each subpixel other than the blue sub-pixel based on the reset grayscale level for driving each subpixel other than the blue sub-pixel in the pixel in the display panel for displaying a corrected image.

Optionally, the image processor is configured to process at least a portion of the cache image to calculate an average grayscale value of the initial grayscale levels of the blue sub-pixels in each one of the one or more portions, and to reset an initial grayscale level of a blue sub-pixel in the pixel in the at least a portion based on the correction scheme when the average grayscale value is smaller than or equal to a threshold value, and to output the grayscale voltage for the blue subpixel based on the reset grayscale level for driving blue sub-pixel in the pixel in the display panel for displaying a corrected image.

Optionally, the grayscale level corrector is configured to generate a first set of N corrected grayscale levels of brightness of a blue sub-pixel for a first correction scheme, and a second set of N corrected grayscale levels of brightness of a blue sub-pixel for a second correction scheme, the second correction scheme being different from the first correction scheme; the image processor is configured to process at least a portion of the cache image to calculate an average grayscale value of the initial grayscale levels of the blue sub-pixels in the at least a portion, to reset an initial grayscale level of at least one sub-pixel in the pixel in the at least a portion based on the first correction scheme when the average grayscale value is greater than a threshold value, to reset an initial grayscale level of at least one sub-pixel in the pixel in the at least a portion based on the second correction scheme when the average grayscale value is smaller than or equal to the threshold value, and to output the grayscale voltage for at least one sub-pixel based on the reset grayscale level for driving the at least one subpixel in the pixel in the display panel for displaying a corrected image.

Optionally, when the average grayscale value is greater than the threshold value, the image processor is configured to reset an initial grayscale level of each sub-pixel other than the blue sub-pixel in the pixel in the at least a portion based on the first correction scheme; when the average grayscale value is smaller than or equal to the threshold value, the image processor is configured to reset an initial grayscale level of a blue sub-pixel in the pixel in the at least a portion based on the second correction scheme.

Optionally, the image processing apparatus further comprises an image divider configured to divide the cache image to a plurality of portions.

Optionally, the image divider comprises an analyzer configured to determine regional color distribution of the cache image read from the cache memory, to divide the cache image into the plurality of portions with different primary colors, and to output respective portions of the cache image to the image processor.

Optionally, the image divider comprises an analyzer configured to determine a size of a screen area in rectangular shape of the display panel, to uniformly divide a width of the screen area to m parts and a length of the screen area to n parts to form m×n first portions, and to output respective cache data of the image within the m×n first portions to the image processor, where m and n are positive integers.

Optionally, the m×n first portions comprise a middle portion having j×k first portions, wherein the analyzer is further divide the middle portion to s×d second portions, and to output respective data of the cache image within the m×n first portions and further respective data of the cache image within the s×d second portions to the image processor, where m, n, j, k, s, and d are positive integers and m>j, s>j, n>k, d>k.

Optionally, the grayscale level corrector comprises a luminance meter configured to measure at least a maximum brightness of a blue sub-pixel by applying a maximum grayscale voltage to the display panel with the added blue-light filter and an analyzer configured to determine the measured maximum brightness to be equal to a brightness corresponding to a grayscale level p of the set of N original grayscale levels of the blue sub-pixel of the display panel without the added blue-light filter, the grayscale level p being set as the threshold value used by the image processor.

Optionally, the grayscale level corrector comprises a luminance meter configured to measure at least a maximum brightness of a blue sub-pixel by applying a maximum grayscale voltage to the display panel with the added blue-light filter and an analyzer configured to determine the measured maximum brightness to be equal to a brightness corresponding to a grayscale level p of the set of N original grayscale levels of the blue sub-pixel of the display panel without the added blue-light filter, the grayscale level p being set as the threshold value used by the image processor; and the analyzer further is configured to calculate a transmittance of the blue-light filter determined by a ratio of the measured maximum brightness with the added blue-light filter over an original maximum brightness without the added blue-light filter, and to determine each grayscale level of the first set of corrected grayscale levels to be an integer obtained by rounding up a product value of the transmittance and each of the original grayscale levels from 0 to N−1.

Optionally, the grayscale level corrector comprises a luminance meter configured to measure at least a maximum brightness of a blue sub-pixel by applying a maximum grayscale voltage to the display panel with the added blue-light filter and an analyzer configured to determine the measured maximum brightness to be equal to a brightness corresponding to a grayscale level p of the set of N original grayscale levels of the blue sub-pixel of the display panel without the added blue-light filter, the grayscale level p being set as the threshold value used by the image processor; and the luminance meter further is configured to measure each reduced brightness level of the blue sub-pixel of the display panel with the added blue-light filter by applying 0 to the maximum grayscale voltage corresponding to the N original grayscale levels from 0 to N−1 of the blue sub-pixel without the added blue-light filter, and the analyzer is further configured to determine each grayscale level of the second set of corrected grayscale levels to be an original grayscale level of the blue sub-pixel having an original brightness level matched with a reduced brightness level of the blue sub-pixel with the added blue-light filter, or is assigned to a nearest adjacent corrected grayscale level if the reduced brightness level has no matched original brightness level.

Optionally, the N is an integer selected from 16 for 4 bits per sampled pixel, or 256 for 8 bits per sampled pixel, or 65236 for 16 bits per sampled pixel, wherein the minimum brightness level 0 represents total absence of light or black and the maximum brightness level N−1 represents total presence of light or white.

Optionally, the image processor comprises a first input terminal configured to receive data of the cache image from the cache memory, a second input terminal configured to receive information about the plurality of portions of the cache image from the image divider, and a third input terminal configured to receive from the grayscale level corrector information about the set of N corrected grayscale levels of brightness of a blue sub-pixel used in the correction scheme.

Optionally, the third input terminal is configured to receive from the grayscale level corrector information about a first set of N corrected grayscale levels of brightness of a blue sub-pixel for a first correction scheme, and a second set of N corrected grayscale levels of brightness of a blue sub-pixel for a second correction scheme, the second correction scheme being different from the first correction scheme; the grayscale level corrector comprises a luminance meter configured to measure at least a maximum brightness of a blue sub-pixel by applying a maximum grayscale voltage to the display panel with the added blue-light filter and an analyzer configured to determine the measured maximum brightness to be equal to a brightness corresponding to a grayscale level p of the set of N original grayscale levels of the blue sub-pixel of the display panel without the added blue-light filter, the grayscale level p being set as the threshold value used by the image processor, and the image processor further comprises an analyzer configured to compare the average grayscale value with the grayscale level p; when the average grayscale value is greater than p, the analyzer is configured to reset the initial grayscale levels of all red sub-pixels and green sub-pixels in the at least a portion based on the first correct scheme; when the average grayscale value is smaller than or equal to p, the analyzer is configured to reset the initial grayscale levels of all blue sub-pixels in the at least a portion based on the second correct scheme.

Optionally, the image processor further comprises an output configured to output the grayscale voltages for at least one sub-pixel based on the reset grayscale level.

In another aspect, the present disclosure provides a display apparatus comprises a display panel coupled to a blue-light filter and an image processing apparatus described herein.

In another aspect, the present disclosure provides a method for correcting color-shift in a displayed image due to brightness change of blue sub-pixels of a display panel with an added blue-light filter configured to filter blue light, the method comprising storing a cache image to be displayed at a current time in a cache memory, the cache image comprising initial grayscale levels corresponding to respective brightness of a plurality of sub-pixels in a pixel; generating a set of N corrected grayscale levels of brightness of a blue sub-pixel for a correction scheme, the set of N corrected grayscale levels respectively one-to-one corresponding to a set of N original grayscale levels from a minimum 0 sequentially up to a maximum N−1 of the blue sub-pixel of the display panel without the added blue-light filter, resetting an initial grayscale levels of at least one sub-pixel in the pixel to a reset grayscale level; and outputting a grayscale voltage based on the reset grayscale level for driving the at least one sub-pixel of the pixel in the display panel for displaying a corrected image.

Optionally, the method further comprises processing at least a portion of the cache image to calculate an average grayscale value of the initial grayscale levels of the blue sub-pixels in the at least a portion; resetting an initial grayscale level of each sub-pixel other than the blue sub-pixel in the pixel in the at least a portion based on the correction scheme when the average grayscale value is greater than a threshold value, and outputting the grayscale voltage for each subpixel other than the blue sub-pixel based on the reset grayscale level for driving each subpixel other than the blue sub-pixel in the pixel in the display panel for displaying a corrected image.

Optionally, the method further comprises processing at least a portion of the cache image to calculate an average grayscale value of the initial grayscale levels of the blue sub-pixels in each one of the one or more portions; resetting an initial grayscale level of a blue sub-pixel in the pixel in the at least a portion based on the correction scheme when the average grayscale value is smaller than or equal to a threshold value; and outputting the grayscale voltage for the blue subpixel based on the reset grayscale level for driving blue sub-pixel in the pixel in the display panel for displaying a corrected image.

Optionally, the method further comprises generating a first set of N corrected grayscale levels of brightness of a blue sub-pixel for a first correction scheme, and a second set of N corrected grayscale levels of brightness of a blue sub-pixel for a second correction scheme, the second correction scheme being different from the first correction scheme; processing at least a portion of the cache image to calculate an average grayscale value of the initial grayscale levels of the blue sub-pixels in the at least a portion; resetting an initial grayscale level of at least one sub-pixel in the pixel in the at least a portion based on the first correction scheme when the average grayscale value is greater than a threshold value, resetting an initial grayscale level of at least one sub-pixel in the pixel in the at least a portion based on the second correction scheme when the average grayscale value is smaller than or equal to the threshold value, and outputting the grayscale voltage for at least one sub-pixel based on the reset grayscale level for driving the at least one subpixel in the pixel in the display panel for displaying a corrected image.

Optionally, the method comprises resetting an initial grayscale level of each sub-pixel other than the blue sub-pixel in the pixel in the at least a portion based on the first correction scheme when the average grayscale value is greater than the threshold value; resetting an initial grayscale level of a blue sub-pixel in the pixel in the at least a portion based on the second correction scheme when the average grayscale value is smaller than or equal to the threshold value.

Optionally, the threshold value is determined by measuring at least a maximum brightness of the blue sub-pixel driven by a highest grayscale voltage applied to a blue sub-pixel of the display panel with the added blue-light filter, matching the maximum brightness to a brightness of the blue sub-pixel driven by a voltage corresponding to an original grayscale level p (p<N) without the added blue-light filter, determining the threshold value to be equal top, wherein the transmittance is obtained by taking a ratio of the maximum brightness of the blue sub-pixel driven by the highest grayscale voltage applied to a blue sub-pixel of the display panel with and without the added blue-light filter.

Optionally, each grayscale level of the first set of N corrected grayscale levels is determined to be an integer obtained by rounding up a product value of the transmittance and each of the original grayscale levels from 0 to N−1; each grayscale level of the second set of N corrected grayscale levels is determined to be an original grayscale level of the blue sub-pixel having an original brightness level matched with a reduced brightness level of the blue sub-pixel with the added blue-light filter, or is assigned to a nearest adjacent corrected grayscale level if the reduced brightness level has no matched original brightness level.

Optionally, the method further comprises dividing the cache image to a plurality of portions.

Optionally, the method further comprises determining regional color distribution of the cache image; and dividing the cache image to the plurality of portions with different primary colors.

Optionally, the method further comprises determining a size of a screen area in rectangular shape of the display panel; and dividing uniformly a width of the screen area to m parts and a length of the screen area to n parts to form m×n first portions, where m and n are positive integers.

Optionally, the m×n first portions comprise a middle portion having j×k first portions; and the method further comprises dividing the middle portion to s×d second portions, wherein m, n, j, k, s, and d are positive integers and m>j, s>j, n>k, d>k.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
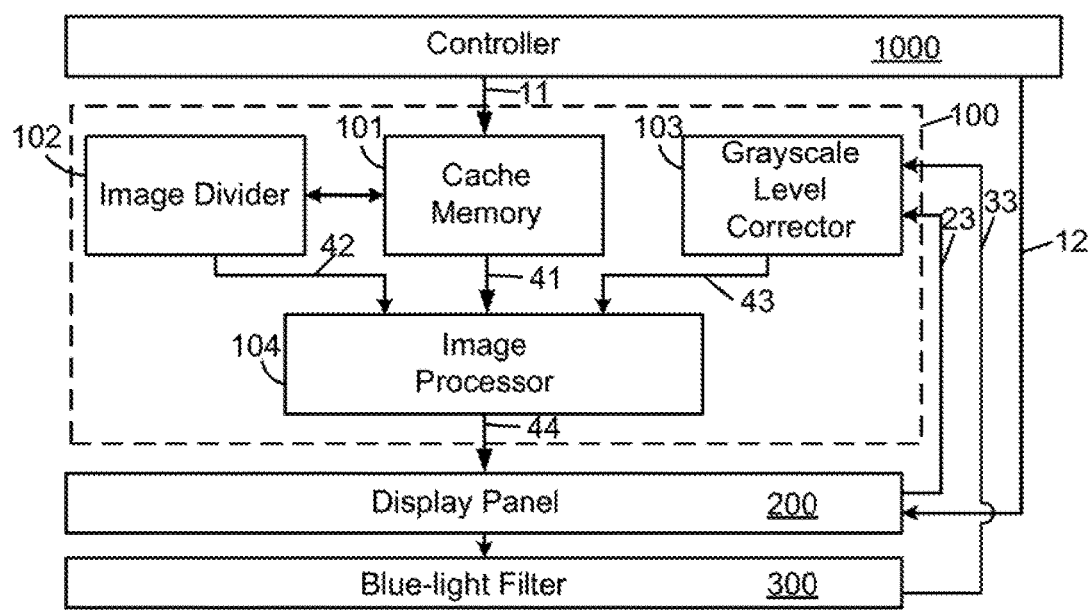
FIG. 1 is a block diagram of an image processing apparatus for correcting color-shift in image displayed by a display panel with added blue-light filter according to some embodiments.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In one aspect, the present disclosure provides an image processing apparatus for correcting color-shift in a displayed image due to brightness change of blue sub-pixels of a display panel with an added a blue-light filter configured to filter blue light. In some embodiments, the image processing apparatus includes a cache memory configured to store a cache image comprising initial grayscale levels corresponding to respective brightness of a plurality of subpixels in a pixel at a current time; a grayscale level corrector configured to generate a set of N corrected grayscale levels of brightness of a blue sub-pixel for a correction scheme, the set of N corrected grayscale levels respectively one-to-one corresponding to a set of N original grayscale levels from a minimum 0 sequentially up to a maximum N−1 of the blue sub-pixel of the display panel without the added blue-light filter; and an image processor coupled respectively to the cache memory and the grayscale level corrector, and configured to reset an initial grayscale level of at least one sub-pixel in the pixel to a reset grayscale level, and to output a grayscale voltage based on the reset grayscale level for driving the at least one sub-pixel of the pixel in the display panel for displaying a corrected image.

In some embodiments, the image processor is configured to process at least a portion of the cache image to calculate an average grayscale value of the initial grayscale levels of the blue sub-pixels in the at least a portion, and to reset an initial grayscale level of each sub-pixel other than the blue sub-pixel in the pixel in the at least a portion based on the correction scheme when the average grayscale value is greater than a threshold value, and to output the grayscale voltage for each subpixel other than the blue sub-pixel based on the reset grayscale level for driving each subpixel other than the blue sub-pixel in the pixel in the display panel for displaying a corrected image. In some embodiments, the image processor is configured to process at least a portion of the cache image to calculate an average grayscale value of the initial grayscale levels of the blue sub-pixels in each one of the one or more portions, and to reset an initial grayscale level of a blue sub-pixel in the pixel in the at least a portion based on the correction scheme when the average grayscale value is smaller than or equal to a threshold value, and to output the grayscale voltage for the blue subpixel based on the reset grayscale level for driving blue sub-pixel in the pixel in the display panel for displaying a corrected image.

In some embodiments, the grayscale level corrector is configured to generate a first set of N corrected grayscale levels of brightness of a blue sub-pixel for a first correction scheme, and a second set of N corrected grayscale levels of brightness of a blue sub-pixel for a second correction scheme, the second correction scheme being different from the first correction scheme; and the image processor is configured to process at least a portion of the cache image to calculate an average grayscale value of the initial grayscale levels of the blue sub-pixels in the at least a portion, to reset an initial grayscale level of at least one sub-pixel in the pixel in the at least a portion based on the first correction scheme when the average grayscale value is greater than a threshold value, to reset an initial grayscale level of at least one sub-pixel in the pixel in the at least a portion based on the second correction scheme when the average grayscale value is smaller than or equal to the threshold value, and to output the grayscale voltage for at least one sub-pixel based on the reset grayscale level for driving the at least one subpixel in the pixel in the display panel for displaying a corrected image. Optionally, when the average grayscale value is greater than the threshold value, the image processor is configured to reset an initial grayscale level of each sub-pixel other than the blue sub-pixel in the pixel in the at least a portion based on the first correction scheme. Optionally, when the average grayscale value is smaller than or equal to the threshold value, the image processor is configured to reset an initial grayscale level of a blue sub-pixel in the pixel in the at least a portion based on the second correction scheme.

In some embodiments, the image processing apparatus further includes an image divider configured to divide the cache image to a plurality of portions. Optionally, the image divider includes an analyzer configured to determine regional color distribution of the cache image read from the cache memory, to divide the cache image into the plurality of portions with different primary colors, and to output respective portions of the cache image to the image processor. Optionally, the image divider includes an analyzer configured to determine a size of a screen area in rectangular shape of the display panel, to uniformly divide a width of the screen area to m parts and a length of the screen area to n parts to form m×n first portions, and to output respective cache data of the image within the m×n first portions to the image processor, where m and n are positive integers.

FIG. 1 is a block diagram of an image processing apparatus for correcting color-shift in image displayed by a display panel with added blue-light filter according to some embodiments. Referring to FIG. 1, an image processing apparatus 100 is implemented with a display panel 200 for correcting color-shift of images displayed while a blue-light filter 300 is added in order to eliminate (at least partially) a portion of blue light spectrum emitted from the back-light source of the display panel 200 for protecting image viewer from potential blue light radiation damage.

The display panel 200 is controlled by a controller 1000 for displaying images dynamically. In other words, the controller 1000 provides all driving voltage signals to control each pixel of the display panel 200 to provide a full screen of image. In particularly, each pixel contains three color sub-pixels, i.e., a red sub-pixel, a green sub-pixel, and a blue sub-pixel. Each color sub-pixel is driven by one of N-level grayscale voltages ranging from level 0 to level (N−1) to determine brightness of each color sub-pixel. After mixing different brightness of the three color sub-pixels, each pixel produces a certain color desired for displaying the image based on original control signals. In other words, theoretically when each sub-pixel is driven by a predetermined grayscale voltage supplied by the controller based on original grayscale levels of each color's designed brightness, the display panel 200 should provide a full screen color image without any color shift problem.

When the blue-light filter 300 is added to be associated with the display panel 200, however, part of blue light radiation is absorbed by the filter so that the intensity of blue light is reduced, causing brightness of the blue sub-pixel to be lower than the original brightness even the blue sub-pixel is still driven by the same predetermined grayscale voltage. The lowered brightness of blue sub-pixels causes color-shift problem, making the displayed image yellowish. The image processing apparatus 100 is intended for correcting the color-shift of the image displayed by the display panel 200.

Optionally, the blue-light filter 300 is a thin film material disposed in front of a screen area of the display panel 200. The thin film material is designated to absorb blue light of wavelengths from 440 nm to 470 nm which is the portion most harmful to human eyes. Optionally, the blue-light filter 300 is an optical film disposed between the back-light module inside the display panel 200. Optionally, the blue-light filter 300 is directly a LED light source with specialized wavelength spectrum in which the harmful portion 440-470 nm of the blue light has been removed.

Referring to FIG. 1, the image processing apparatus 100 includes a cache memory 101, an image divider 102, a grayscale level corrector 103, and an image processor 104. The cache memory 101 is configured to receive and store data of a cache image from controller 1000 (which is originally designated to send image data to control the display panel 200 for displaying image. As the image can be a video image displayed dynamically, the cache image is an image to be displayed at a current time. The cache image contains all digital information of initial grayscale levels of brightness expected for each red sub-pixel, green sub-pixel, and blue sub-pixel of each pixel that is mixed to show a specific color to viewers. The cache memory is a small-sized type of volatile computer memory that provides high-speed data access to a processor or is embedded in main random access memory (RAM).

In some embodiments, the image divider 102 is coupled to the cache memory 101 and the image processor 104. The image divider 102, optionally, includes an analyzer (not explicitly shown) to be able to read the data from the cache memory and perform certain pixel-based analyses or partition calculations. For example, it can perform an analysis such as color identification analysis or spatial analysis to characterize the cache image. Based on the result of the analysis, the image divider 102 can sort the digital information of the cache image into multiple sub-sets of data corresponding to one or more portions divided from the cache image. For example, based on the color identification analysis, each portion has substantially one primary color (e.g., red color, or blue color). In another example, based on spatial analysis, the cache image, presumably in a rectangular shape, with its width being uniformly divided into m parts and its length being uniformly divided into n parts, is divided into m×n portions, where m and n are positive integers. Each portion still contains the original information of all pixels therein including some sub-pixels having reduced brightness levels due to an added blue-light filter. Yet, the image divider 102 makes that the data in each portion can be separately sent via an output port 42 to the image processor 104 and processed separately as well. By dividing the cache image into one or more portions, the digital image data in each portion can be processed to correct image color-shift in more accurate way.

In some embodiments, the grayscale level corrector 103 is one of components of the image processing apparatus specifically added for correcting color-shift due to brightness change of one-color sub-pixels of the image. The grayscale level corrector 103 includes a luminance meter and an analyzer (both are not explicitly shown in FIG. 1). The luminance meter is configured to measure light intensity of any color and store its measurement in a temporary memory device associated with the grayscale level corrector 103. In particular, the grayscale level corrector 103 is able to at least measure brightness levels of all blue light from each blue sub-pixel of each pixel of the display panel 200. In an implementation of operating the grayscale level corrector 103, the controller 1000 sends a maximum grayscale voltage via a signal line 12 to drive the blue sub-pixel of the display panel 200. The maximum grayscale voltage is determined by a corresponding maximum grayscale level assigned to any color sub-pixel for producing a maximum brightness of the blue sub-pixel. In general, the grayscale level is a quantized form to characterize light intensity (excluding color) from a minimum brightness to a maximum brightness. In an example, an N-level grayscale is adopted in this disclosure for illustration purpose. The minimum brightness is 0, representing total absence of light or black. The maximum brightness is N−1, representing total presence of light or white. The luminance meter is configured to measure the maximum brightness by receiving the blue color light emitted from the blue sub-pixel and record the measured brightness value T to the grayscale level corrector 103 via a signal line 23 for any display panel 200 without the added blue-filter 300. However, when the blue-light filter 300 is disposed in association with the display panel 200 for protecting viewer from potential eye-damage due to certain high-energy blue-light radiation, the brightness level measured by the luminance meter will be lowered to T' even though the driving grayscale voltage is at the same highest level applied to the same blue sub-pixel. The reduced brightness value T' is recorded to the grayscale level corrector 103 via another signal line 33.

In some embodiments, the analyzer associated with the grayscale level corrector 103 is configured to analyze the recorded maximum brightness value T and a corresponding reduced brightness value T'. By taking a ratio of the reduced brightness value T' over the maximum brightness value T corresponding to an original maximum grayscale level of the blue sub-pixel yields a transmittance of blue color light associated with the blue-light filter 300 disposed to the display panel 200. In addition, by matching the reduced brightness value T' with an original brightness level corresponding to a grayscale level p of brightness of the blue sub-pixel, the grayscale level p is selected to be a threshold value to be used by the image processor 104 for correcting color-shift of the image. Based on the information about the transmittance and the threshold value recorded in the grayscale level corrector 103, a first color-shift correction scheme can be established by obtaining and storing a one-to-one correspondence relationship between the original set of N grayscale levels, namely, 0, 1, 2, . . . , N−1 and a first set of N corrected grayscale levels. This first correction scheme then will be implemented by providing the information of the one-to-one correspondence relationship as an input of the image processor 104. In particular, each of the first set of N corrected grayscale levels would be set to an integer value obtained by rounding up a product value of the transmittance and each of the set of N original grayscale levels from 0 to N−1. A specific embodiment will be shown below to illustrate the execution of the first correction scheme.

In some alternative embodiments, the luminance meter of the grayscale level corrector 103 is also configured to measure different brightness level of a blue sub-pixel of the display panel 200 driven by each original grayscale level based on preset N levels from 0 to N−1 while with the added blue-light filter 300. The analyzer associated with the grayscale level corrector 103 can be operated trying to match each measured brightness level obtained with one grayscale level i from 0 to N−1 for a blue sub-pixel with an original brightness level determined by one lower grayscale level j (j<i) selected from 0 to N−1 for driving the same blue sub-pixel but without the added blue-light filter 300. Thus, the grayscale level i is selected to be a corrected grayscale level corresponding to the original grayscale level j. Through this brightness matching operation, a second color-shift correction scheme can be established by deducing a second set of N corrected grayscale levels one-to-one corresponding to the set of N original grayscale levels from 0 to N−1. In case the analyzer cannot find a matched original brightness level for a measured brightness level associated with a specific grayscale level, for example, i+1, the corrected grayscale level of this brightness level is just assigned to be the previous nearest grayscale level i which has a matched original brightness level determined by the grayscale level j. In particular, at the maximum grayscale level N−1, the measured brightness level only matches the original brightness level given by the grayscale level p. All original brightness levels determined by the grayscale levels higher than p do not have matched ones in the measured brightness with the blue-light filter being added. Thus, the corrected grayscale levels corresponding to those original grayscale levels are all assigned to the nearest one, which is N−1, having the matched original brightness level. A specific embodiment will be shown below to illustrate the execution of the second correction scheme.

Referring to FIG. 1, the image processor 104 is configured to have a first input terminal 41 receiving the data of the cache image from the cache memory, a second input terminal 42 receiving information about the one or more portions of the cache image from the image divider, and a third input terminal 43 receiving information about the first set of N corrected grayscale levels of brightness of a blue sub-pixel used in the first correction scheme and the second set of N corrected grayscale levels of brightness of a blue sub-pixel used in the second correction scheme. Further, the image processor 104 includes an analyzer to process the received data in each portion of the cache image divided by the image divider 102 and calculate an average grayscale value of the initial grayscale levels of blue sub-pixels in each one of the one or more portions. The analyzer further is configured to compare the corresponding average grayscale value with the threshold value which is just the grayscale level p determined by the grayscale level corrector 103. In some embodiments, the image processor 104 is configured to reset the initial grayscale levels of all red sub-pixels and green sub-pixels in the corresponding one of the one or more portions to corresponding ones of first set of corrected grayscale levels based on the first correct scheme once the corresponding average grayscale value is greater than the threshold value p. The first correction scheme helps to pull down the brightness of red sub-pixel and green sub-pixel proportional to the reduced brightness of blue sub-pixel so that the overall color-shift problem due to brightness reduction caused by the added blue-light filter can be corrected. Alternatively, the image processor 104 is configured to reset the initial grayscale levels of all blue sub-pixels in the corresponding one of the one or more portions to corresponding ones of second set of corrected grayscale levels based on the second correct scheme once the corresponding average grayscale value is smaller than or equal to the threshold value p. The second correction scheme helps to pull up the actual brightness level of blue sub-pixel to adapt the normal brightness of red sub-pixel and green sub-pixel so that the color-shift problem of the image can be, at least partially, corrected.

In a specific embodiment, the threshold value p is obtained using the following equation:

$$T(X'\text{max})=T(Xp).$$

T(X'max) is an actual brightness value of a pixel corresponding to a maximum grayscale level "max" of a first-color (X=blue) sub-pixel. Here, the pixel has color-shift due to the existence of the blue-light filter 300 and the actual brightness value is measured by the luminance meter associated with the grayscale level corrector 103. In this disclosure, the maximum grayscale level max is N−1 as defined earlier. For example, for a 4-bit pixel, the maximum grayscale level N−1 is 15. For an 8-bit pixel, the maximum grayscale level N−1 is 255. For a 16-bit pixel, the maximum grayscale level N−1 is 65,235. T(Xp) is a theoretical brightness value of the pixel corresponding to a threshold grayscale level p of the first-color (blue) sub-pixel. Here, the pixel has no color-shift (without the added blue-light filter 300). Just because of adding the blue-light filter 300, the actual brightness value of a displayed image is lower than the theoretical brightness value.

In some embodiments, the first correction scheme implemented by the image processor 104 includes a pre-correction procedure of determining a correspondence relationship per pixel between a set of N original grayscale levels of a blue sub-pixel of the pixel and corresponding levels of the first set of N corrected grayscale levels of the blue sub-pixel recorded in the grayscale level corrector 103. Specifically, the transmittance of the display panel with the added blue-light filter is obtained by the grayscale level corrector 103 using following formula:

$$\theta = T(X'\text{max})/T(X\text{max}).$$

$\theta$ is the transmittance of the display panel. T(X'max) is an actual brightness value of a pixel corresponding to a maximum grayscale level "max" of a first-color (X=blue) sub-pixel. T(Xmax) is a theoretical brightness value of a pixel corresponding to a maximum original grayscale level of a first-color (blue) sub-pixel without the blue-light filter. Then, the first set of N corrected grayscale levels are determined by multiplying the transmittance of the display panel with the added blue-light filter with the set of N original grayscale levels from 0 to N−1:

$$T(X'y)=T(Xx)\times\theta.$$

x is one of the N original grayscale levels of the first-color (Blue) sub-pixel. y is the one of the first set of N corrected grayscale levels corresponding to x. T(X'y) is the actual brightness level of a pixel associated with the grayscale level of the first-color X (blue) sub-pixel at y. T(Xx) is the original theoretical brightness level of the pixel associated with the original grayscale level of the blue sub-pixel at x.

In an example, total number of grayscale levels for each sub-pixel is N=256. For the convenience of explanation of the present invention, the theoretical brightness level of each sub-pixel is defined directly by the corresponding grayscale level. Thus, the brightness levels are also represented by 256 levels from 0 to 255. Assuming that the actual brightness level of the first-color sub-pixel corresponding to its maximum grayscale level is i (i<N) and the theoretical brightness level of the first-color sub-pixel corresponds to an original maximum grayscale level 255, the transmittance of the display panel associated with the first-color sub-pixel then is $\theta$=i/255. Multiplying the transmittance $\theta$ of the display panel with the added blue-light filter with the set of 256 original grayscale levels from 0 to 255 would yield a set of actual brightness levels respectively corresponding to the original grayscale levels of the first-color (blue) sub-pixel. The actual brightness at all levels should be rounded to a nearest integer to obtain the following table.

TABLE 1

| First-color original grayscale levels | Theoretical Brightness | Actual Brightness |
| --- | --- | --- |
| 0 | 0 | a |
| 1 | 1 | a |
| 2 | 2 | b |
| 3 | 3 | b |
| 4 | 4 | c |
| ... | ... | ... |
| 254 | 254 | i − 1 |
| 255 | 255 | i |

In Table 1, the numbers a, b, c, ... and i are all positive integers. Because of the round-up operation after calculating the actual brightness levels, each actual brightness level in above table may correspond to one or more grayscale levels of the first-color sub-pixel. For example, the actual brightness level a corresponds to two original grayscale levels 0 and 1. In an embodiment, i=p, and p is defined as a threshold value of a specific original grayscale level having a theoretical brightness level equal to the maximum actual brightness level associated with the original maximum grayscale level 255. Note, Table 1 is merely one example of illustrating the one-to-one correspondence relationship between the actual brightness level and the original grayscale levels of the first-color sub-pixel.

In an embodiment, the actual brightness levels shown in last column of Table 1 can be considered to be theoretical brightness levels of the same first-color sub-pixel of the display panel having color-shift the added blue-light filter. Each of those brightness levels can be directly assigned to be a corresponding one level of a first set of corrected grayscale levels of the first-color sub-pixel. Thus, a one-to-one correspondence relationship between the first-color original grayscale levels and the corrected grayscale levels can be obtained in Table 2 below.

TABLE 2

| First-color original grayscale levels x | First-color corrected grayscale levels y |
|---|---|
| 0 | a |
| 1 | a |
| 2 | b |
| 3 | b |
| 4 | c |
| ... | ... |
| 254 | i − 1 |
| 255 | i |

In Table 2, the one-to-one correspondence relationship between each first-color original grayscale level x and a corresponding first-color corrected grayscale level y is represented by the following formula:

$$T(X'y)=T(Xx)\times\theta,$$

which can be saved in a non-volatile memory device associated with the grayscale level corrector 103 and readily outputted to the image processor 104.

Based on the correspondence relationship obtained above, a color-shift correction procedure can be executed by the image processor 104 to replace the initial grayscale levels of other two color sub-pixels, a red sub-pixel and a green sub-pixel, of the same pixel of the first-color (blue) sub-pixel by the corresponding same levels of the first set of corrected grayscale levels of the blue sub-pixel. For example, for correcting a grayscale level 2 of a red sub-pixel, the corresponding corrected grayscale level can be obtained to be a level c from Table 2. For the actual brightness level i of the blue sub-pixel under 0-255 grayscale levels, the maximum brightness of the red sub-pixel and the green sub-pixel after the color-shift correction procedure will be also corrected to the same level i. So, this correction scheme effectively reduces overall brightness of the image. After executing the correction procedure, the image processor 104 outputs corresponding grayscale voltages based on the corrected grayscale levels to the display panel to drive respective first (blue), second (red), and third (green) color sub-pixels to display a corrected image substantially without color-shift, though overall brightness of the corrected image is lower.

In some embodiments, the second correction scheme implemented by the image processor 104 includes a pre-correction procedure of determining a correspondence relationship per pixel between a set of N original grayscale levels of a blue sub-pixel of the pixel and corresponding levels of the second set of N corrected grayscale levels of the blue sub-pixel recorded in the grayscale level corrector 103. Specifically, the actual brightness associated with a level of the second set of N corrected grayscale levels should be equal to the theoretical brightness associated with a corresponding level of the set of N original grayscale levels of a same blue sub-pixel, based on the following formula:

$$T(X'z)=T(Xx),$$

where x is one of the set of N original grayscale levels, z is one of second set of N corrected grayscale levels corresponding to x, T is brightness of the first color X=blue, and X' represents the brightness associated with the display panel having the blue-light filter. For any original grayscale level greater than the threshold value p (a grayscale level lower than the maximum level N−1), the corresponding corrected grayscale level should be just assigned to the maximum level.

Again, using the example of total number of grayscale levels for each sub-pixel being given N=256. For the convenience of explanation of the present invention, the theoretical brightness level of each sub-pixel is defined directly by the corresponding grayscale level. Thus, the brightness levels are also represented by 256 levels from 0 to 255. Using the grayscale level corrector 103 to measure the actual brightness level associated with each grayscale level from 0 to 255 to obtain the following table:

TABLE 3

| First-color original grayscale level | Actual Brightness |
|---|---|
| 0 | a |
| 1 | b |
| 2 | c |
| ... | ... |
| 254 | i − 1 |
| 255 | i |

As the original grayscale level has an one-to-one correspondence relationship with e the theoretical brightness of the first-color sub-pixel, the theoretical brightness is considered to be the grayscale level without have the blue-light filter. When the blue-light filter is added, the actual brightness level associated with the original grayscale level should be matched with a theoretical brightness level associated with a corresponding one original grayscale level. Therefore, a correspondence table can be obtained below:

TABLE 4

| Brightness levels | First-color grayscale levels without reduction in brightness | First-color grayscale levels with reduction in brightness |
|---|---|---|
| 0 | 0 | a |
| 1 | 1 | b |
| 2 | 2 | c |
| ... | ... | ... |
| i | i | 255 |
| ... | ... | ... |
| 254 | 254 | none |
| 255 | 255 | none |

Again, the first-color grayscale levels without reduction in brightness (due to any addition of a blue-light filter) can be considered to be just the set of 256 original grayscale levels. The first-color grayscale levels with reduction in brightness then can be considered to be just the second set of 256 corrected grayscale levels. Thus, the correspondence relationship per pixel between a set of N original grayscale levels of a blue sub-pixel without the added blue-light filter and the second set of N corrected grayscale levels of the blue sub-pixel with the blue-light filter is established as the table below:

TABLE 5

| First-color original grayscale levels x | First-color corrected grayscale levels z |
|---|---|
| 0 | a |
| 1 | b |
| 2 | c |
| ... | ... |
| i | 255 |
| ... | ... |
| 254 | 255 |
| 255 | 255 |

In Table 5, the first-color original grayscale level x corresponds one-to-one to the first-color corrected grayscale level z by satisfying the following formula about matching brightness levels before and after the addition of a blue-light filter to the display panel:

$$T(X'z)=T(Xx).$$

The correspondence relationship is stored in the grayscale level corrector 103 and readily outputted to the image processor 104.

Based on the correspondence relationship obtained above, another color-shift correction procedure can be executed by the image processor 104 to replace the initial grayscale levels of the blue (first-color) sub-pixel by the corresponding level of the second set of corrected grayscale levels of the blue (first-color) sub-pixel. For example, for correcting an initial grayscale level 2, the corresponding corrected grayscale level can be obtained to be a level c from Table 5. For any original grayscale level x that is greater than the threshold value p=i, no correspondence relationship exists between the original grayscale level and the second set of corrected grayscale levels. Then, all those corrected grayscale levels are assigned to just the maximum grayscale level 255. So, the brightness level of the blue sub-pixel, which has suffered some reduction in brightness due to the addition of a blue-light filter at the display panel, is raised in this correction scheme so as to improve the image quality by reducing at least partially the color-shift problem. Comparing to the first correction scheme, more levels of brightness can be displayed via the second correction scheme using the second set of corrected grayscale levels. However, when the uncorrected grayscale level is greater than the threshold value p, the displayed image still has minor color-shift problem.

In some embodiments, the image processing apparatus 100 is configured to use a cache memory 101 to store a cache image comprising initial grayscale levels corresponding to respective brightness of a red sub-pixel, a green sub-pixel, and a blue sub-pixel of each pixel at a current time. The image processing apparatus further uses an image divider 102 to divide the cache image into one or more portions. In each of the one or more portions, the image processing apparatus uses an image processor 104 to calculate an average grayscale value of the initial grayscale levels of the blue sub-pixels and use a grayscale level corrector 103 to record a first set of N corrected grayscale levels of brightness of a blue sub-pixel for a first correction scheme, a second set of N corrected grayscale levels of brightness of a blue sub-pixel for a second correction scheme, respectively corresponding to a set of original grayscale levels. The grayscale level corrector 103 further deduces a transmittance associated with the added blue-light filter with the display panel as well as a threshold value of the grayscale level associated with a reduced maximum brightness matching with an original brightness corresponding to a lower grayscale level. If the average grayscale value is found to be greater than a threshold value, the image processor 104 is configured to reset the initial grayscale levels of each red sub-pixel and each green sub-pixel for each pixel based on the first correction scheme using the first set of corrected grayscale levels for the blue sub-pixel. Alternatively, if the average grayscale value in the selected one of the one or more portions is found to be smaller than or equal to the threshold value, the image processor 104 us configured to reset the initial grayscale level of each blue sub-pixel for each pixel in the corresponding one of the one or more portions based on the second correction scheme. The image processor 104 then outputs corresponding grayscale voltages based on the corresponding reset grayscale levels respectively for driving each red sub-pixel, green sub-pixel, and blue sub-pixel of each pixel in the display panel with an added blue-light filter for displaying a corrected image.

In another aspect, the present disclosure provides method for correcting color-shift in a displayed image due to brightness change of blue sub-pixels of a display panel with an added blue-light filter configured to filter blue light. In some embodiments, the method includes storing a cache image to be displayed at a current time in a cache memory, the cache image comprising initial grayscale levels corresponding to respective brightness of a plurality of sub-pixels in a pixel; generating a set of N corrected grayscale levels of brightness of a blue sub-pixel for a correction scheme, the set of N corrected grayscale levels respectively one-to-one corresponding to a set of N original grayscale levels from a minimum 0 sequentially up to a maximum N−1 of the blue sub-pixel of the display panel without the added blue-light filter, resetting an initial grayscale levels of at least one sub-pixel in the pixel to a reset grayscale level; and outputting a grayscale voltage based on the reset grayscale level for driving the at least one sub-pixel of the pixel in the display panel for displaying a corrected image.

In some embodiments, the method further includes processing at least a portion of the cache image to calculate an average grayscale value of the initial grayscale levels of the blue sub-pixels in the at least a portion; resetting an initial grayscale level of each sub-pixel other than the blue sub-pixel in the pixel in the at least a portion based on the correction scheme when the average grayscale value is greater than a threshold value, and outputting the grayscale voltage for each subpixel other than the blue sub-pixel based on the reset grayscale level for driving each subpixel other than the blue sub-pixel in the pixel in the display panel for displaying a corrected image. In some embodiments, the method further includes processing at least a portion of the cache image to calculate an average grayscale value of the initial grayscale levels of the blue sub-pixels in each one of the one or more portions; resetting an initial grayscale level of a blue sub-pixel in the pixel in the at least a portion based on the correction scheme when the average grayscale value is smaller than or equal to a threshold value, and outputting the grayscale voltage for the blue subpixel based on the reset grayscale level for driving blue sub-pixel in the pixel in the display panel for displaying a corrected image.

In some embodiments, the method further includes generating a first set of N corrected grayscale levels of brightness of a blue sub-pixel for a first correction scheme, and a second set of N corrected grayscale levels of brightness of a blue sub-pixel for a second correction scheme, the second correction scheme being different from the first correction scheme; processing at least a portion of the cache image to calculate an average grayscale value of the initial grayscale levels of the blue sub-pixels in the at least a portion; resetting an initial grayscale level of at least one sub-pixel in the pixel in the at least a portion based on the first correction scheme when the average grayscale value is greater than a threshold value, resetting an initial grayscale level of at least one sub-pixel in the pixel in the at least a portion based on the second correction scheme when the average grayscale value is smaller than or equal to the threshold value, and outputting the grayscale voltage for at least one sub-pixel based on the reset grayscale level for driving the at least one subpixel in the pixel in the display panel for displaying a corrected image. Optionally, the method includes resetting an initial grayscale level of each sub-pixel other than the blue sub-pixel in the pixel in the at least a portion based on the first correction scheme when the average grayscale value is greater than the threshold value; resetting an initial grayscale level of a blue sub-pixel in the pixel in the at least a portion based on the second correction scheme when the average grayscale value is smaller than or equal to the threshold value.

In some embodiments, the method further includes dividing the cache image to a plurality of portions. Optionally, the method further includes determine regional color distribution of the cache image; and dividing the cache image to the plurality of portions with different primary colors. Optionally, the method further includes determining a size of a screen area in rectangular shape of the display panel; and dividing uniformly a width of the screen area to m parts and a length of the screen area to n parts to form m×n first portions, where m and n are positive integers. Optionally, the m×n first portions comprise a middle portion having j×k first portions; and the method further includes dividing the middle portion to s×d second portions, wherein m, n, j, k, s, and d are positive integers and m>j, s>j, n>k, d>k.

Optionally, the threshold value is determined by measuring at least a maximum brightness of the blue sub-pixel driven by a highest grayscale voltage applied to a blue sub-pixel of the display panel with the added blue-light filter, matching the maximum brightness to a brightness of the blue sub-pixel driven by a voltage corresponding to an original grayscale level p (p<N) without the added blue-light filter, determining the threshold value to be equal to p, wherein the transmittance is obtained by taking a ratio of the maximum brightness of the blue sub-pixel driven by the highest grayscale voltage applied to a blue sub-pixel of the display panel with and without the added blue-light filter.

Optionally, each grayscale level of the first set of N corrected grayscale levels is determined to be an integer obtained by rounding up a product value of the transmittance and each of the original grayscale levels from 0 to N–1. Optionally, each grayscale level of the second set of N corrected grayscale levels is determined to be an original grayscale level of the blue sub-pixel having an original brightness level matched with a reduced brightness level of the blue sub-pixel with the added blue-light filter. Optionally, each grayscale level of the second set of N corrected grayscale levels is determined to be a nearest adjacent corrected grayscale level if the reduced brightness level has no matched original brightness level.

Figure 2:
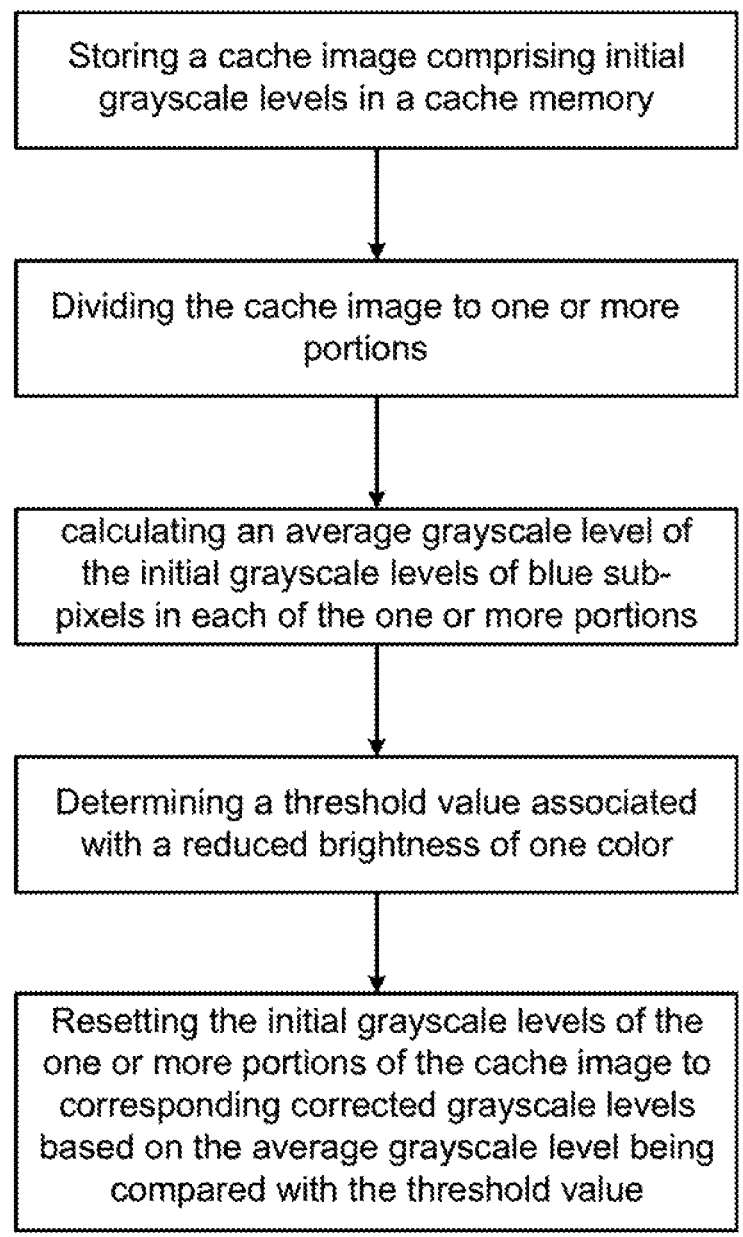
FIG. 2 is a flow chart showing a method for controlling the image processing apparatus for correcting color-shift in image according to some embodiments.

In another aspect, the present disclosure provides a method for controlling an image processing apparatus to correct color-shift caused by brightness reduction of one-color sub-pixel. The one-color can be the first-color, or the blue color. The image processing apparatus is substantially the apparatus 100 disclosed in FIG. 1, including at least a cache memory, an image divider, a grayscale level corrector, and an image processor. As shown in FIG. 2, the method includes storing a cache image to be displayed at a current time in the cache memory, the cache image comprising initial grayscale levels corresponding to respective brightness of a red sub-pixel, a green sub-pixel, and a blue sub-pixel of each pixel. The cache image may be an instant image of a plurality of dynamic images to be displayed via a display panel which includes a blue-light filter for protect human eyes from high-energy blue light at certain wavelength spectrum around 440 nm to 470 nm. The method further includes operating the image divider to divide the cache image into one or more portions. The image data in each portion should be readily available for the image processor to process for correcting possible color-shift of the image thereof. Additionally, the method includes operating the image processor to calculate an average grayscale level of the initial grayscale levels of blue sub-pixels in each of the one or more portions and determine a threshold value associated with a transmittance of the added blue-light filter. The transmittance is determined by the grayscale level corrector which is configured to measure a ratio of maximum brightness before and after disposing the blue-light filter with the display panel. The grayscale level corrector also is configured to record, for a blue sub-pixel of each pixel, a first set of corrected grayscale levels under a first correction scheme and a second set of corrected grayscale levels under a second correction scheme, respectively corresponding to a set of original grayscale levels which is the basis for the initial grayscale levels of the blue sub-pixel of the cache image in each of the one or more portions. Furthermore, the method includes resetting the initial grayscale levels of the one or more portions of the cache image to corresponding corrected grayscale levels based on the average grayscale level in the corresponding one or more portions being compared with the threshold value. When the average grayscale level is greater than the threshold value, the method includes correcting the initial grayscale levels of a red sub-pixel and a green sub-pixel to a corresponding one of the first set of corrected grayscale levels of the blue sub-pixel under the first correction scheme. When the average grayscale level is smaller than or equal to the threshold value, the method includes correcting the initial grayscale level of the blue sub-pixel to a corresponding one of the second set of the corrected grayscale levels under the second correction scheme. Then, the image processor is configured to combine all of the one or more portions of the image with corrected grayscale levels and output corresponding grayscale voltages for driving respective sub-pixels to display a corrected image on the display panel. This method takes advantages of each of the first and the second correction schemes to correct color-shift problem of the image and enhance the brightness of the image with color-shift correction.

Figure 3:
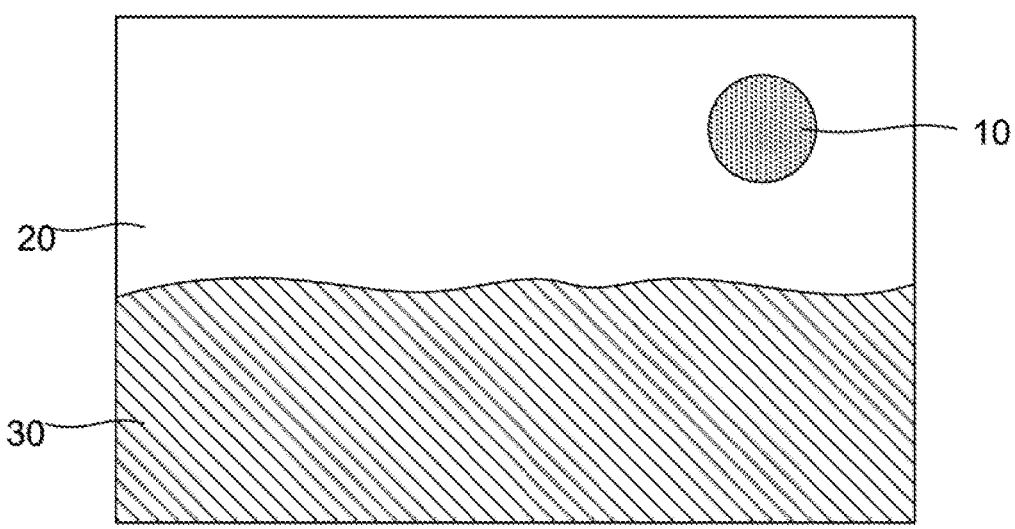
FIG. 3 is a schematic diagram showing an option for dividing an image for correcting color-shift according to an embodiment.

In some specific embodiments, operating the image divider to divide the cache image into one or more portions can be executed in one of following manners. In an example, as shown in FIG. 3, the cache image is divided into multiple portions with different primary colors therein. Each portion may have different shape and one primary color. Portion 10 is a substantial circular shape having one primary color, e.g., in red. Portion 20 at the top part of the image may have another primary color in blue. Portion 30 at the bottom part of the image may have another primary color in green. Then the method described above can be applied to each of the multiple portions to separately perform the color-shift correction and combine all the corrected portions to obtain a corrected full image.

Figure 4:
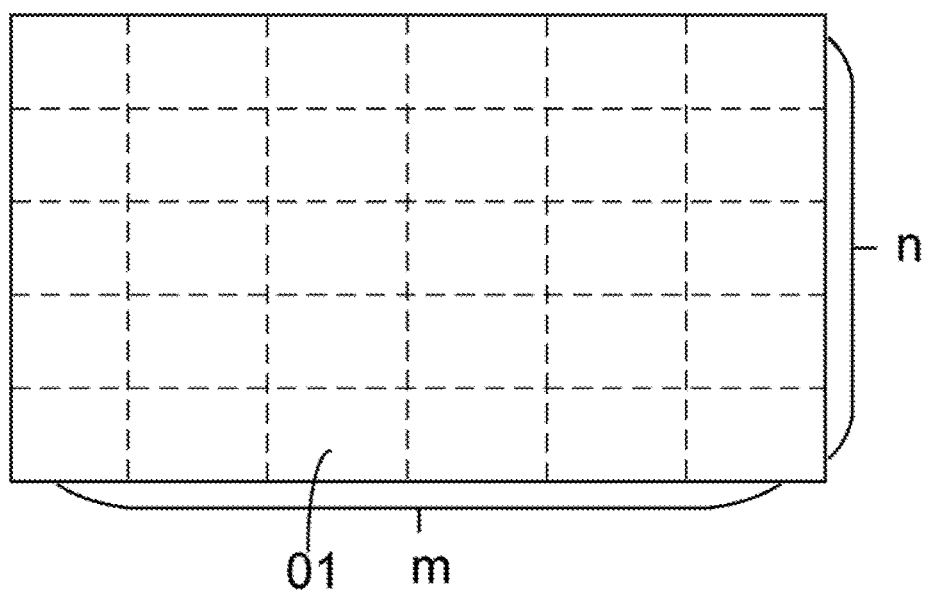
FIG. 4 is a schematic diagram showing another option for dividing an image for correcting color-shift according to an embodiment.

In another example, as shown in FIG. 4, the cache image can be divided uniformly into m×n first portions 01 by equally dividing a width of the cache image into m parts and equally dividing a length of the cache image into n parts, where m and n are positive integers. Then the method described above can be applied to each first portion 01 to perform the color-shift correction and combine all corrected images in all m×n first portions 01 to obtain a corrected full image.

Figure 5:
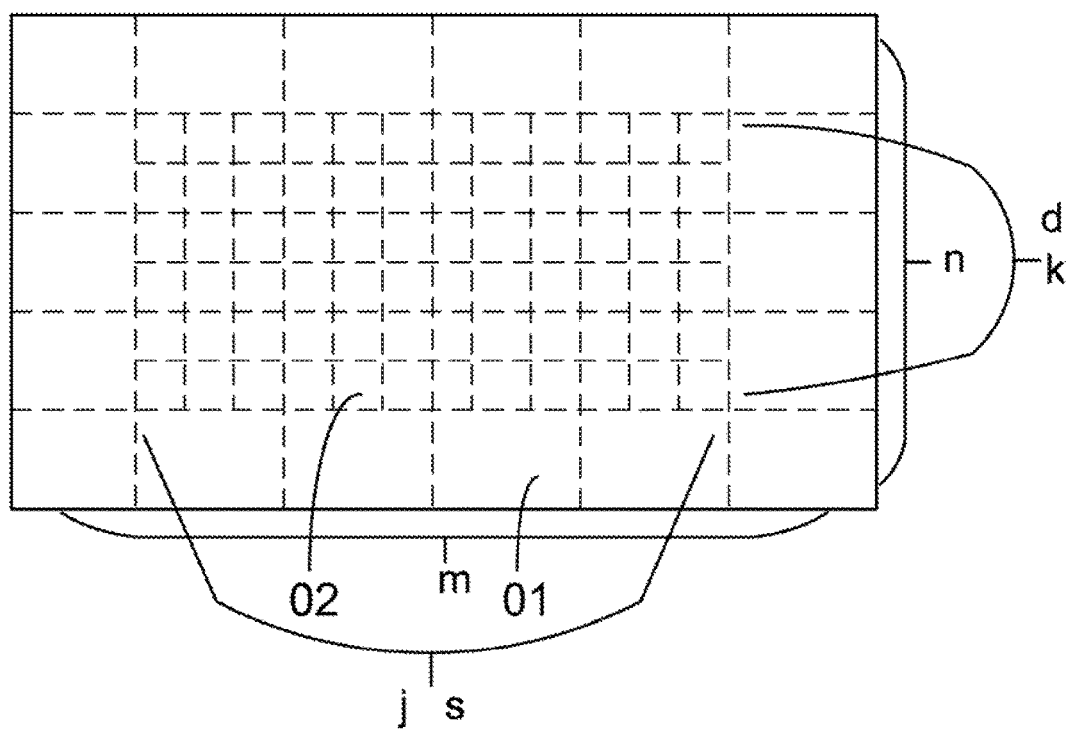
FIG. 5 is a schematic diagram showing an option of additionally dividing middle portion of divided image of FIG. 4 according to another embodiment.

In yet another example, as shown in FIG. 5, the cache image can be divided uniformly into m×n first portions 01 (as shown in FIG. 4) and the j×k first portions 01 located near a middle part of the m×n first portions 01 are further divided uniformly into s×d smaller second portions 02. Here, j, k, s, d are all positive integers and m>j, s>j, n>k, d>k. The middle part of an image displayed on a display panel usually is a focal region from viewer's point of view and often the viewer pays less attention to boundary portions of the image who is viewing. By further dividing the middle part into multiple smaller second portions, the method of color-shift correction described above can be performed in each smaller second portion to have more accurate color-shift correction which involves the calculation of average grayscale level in each portion and resetting of the grayscale levels therein. Therefore, the quality of the full image can be improved even more with more detailed correction of the color-shift problem in respective smaller portions of the image.

In an alternative embodiment, the present disclosure provides a display apparatus including a display panel for displaying image with blue-light protection and color-shift correction. The display apparatus includes a display panel coupled with a blue-light filter capable of filtering out major harmful blue-light wavelength of 440 nm-470 nm. The display panel is coupled with the image processing apparatus to provide color-shift correction to each image having brightness reduction due to the addition of the blue-light filter. The image processing apparatus for correcting the color-shift problem of the image is substantially the same apparatus 100 shown in FIG. 1 and can be controlled by a method shown in FIG. 2 for performing color-shift correction for each image dynamically shown on the display panel.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An image processing apparatus for correcting color-shift in a displayed image due to brightness change of blue sub-pixels of a display panel with an added a blue-light filter configured to filter blue light, the image processing apparatus comprising:
   a cache memory configured to store a cache image comprising initial grayscale levels corresponding to respective brightness of a plurality of subpixels in a pixel at a current time;
   a grayscale level corrector configured to generate a set of N corrected grayscale levels of brightness of a blue sub-pixel for a correction scheme, the set of N corrected grayscale levels respectively one-to-one corresponding to a set of N original grayscale levels from a minimum 0 sequentially up to a maximum N−1 of the blue sub-pixel of the display panel without the added blue-light filter; and
   an image processor coupled respectively to the cache memory and the grayscale level corrector, and configured to reset an initial grayscale level of of at least one sub-pixel in the pixel to a reset grayscale level, and to output a grayscale voltage based on the reset grayscale level for driving the at least one sub-pixel of the pixel in the display panel for displaying a corrected image.

2. The image processing apparatus of claim 1, wherein the image processor is configured to process at least a portion of the cache image to calculate an average grayscale value of the initial grayscale levels of the blue sub-pixels in the at least a portion, and to reset an initial grayscale level of each sub-pixel other than the blue sub-pixel in the pixel in the at least a portion based on the correction scheme when the average grayscale value is greater than a threshold value, and to output the grayscale voltage for each subpixel other than the blue sub-pixel based on the reset grayscale level for driving each subpixel other than the blue sub-pixel in the pixel in the display panel for displaying a corrected image.

3. The image processing apparatus of claim 1, wherein the image processor is configured to process at least a portion of the cache image to calculate an average grayscale value of the initial grayscale levels of the blue sub-pixels in each one of the one or more portions, and to reset an initial grayscale level of a blue sub-pixel in the pixel in the at least a portion based on the correction scheme when the average grayscale value is smaller than or equal to a threshold value, and to output the grayscale voltage for the blue subpixel based on the reset grayscale level for driving blue sub-pixel in the pixel in the display panel for displaying a corrected image.

4. The image processing apparatus of claim 1, wherein the grayscale level corrector is configured to generate a first set of N corrected grayscale levels of brightness of a blue sub-pixel for a first correction scheme, and a second set of N corrected grayscale levels of brightness of a blue sub-pixel for a second correction scheme, the second correction scheme being different from the first correction scheme;

the image processor is configured to process at least a portion of the cache image to calculate an average grayscale value of the initial grayscale levels of the blue sub-pixels in the at least a portion, to reset an initial grayscale level of at least one sub-pixel in the pixel in the at least a portion based on the first correction scheme when the average grayscale value is greater than a threshold value, to reset an initial grayscale level of at least one sub-pixel in the pixel in the at least a portion based on the second correction scheme when the average grayscale value is smaller than or equal to the threshold value, and to output the grayscale voltage for at least one sub-pixel based on the reset grayscale level for driving the at least one sub-pixel in the pixel in the display panel for displaying a corrected image.

5. The image processing apparatus of claim 4, wherein:
when the average grayscale value is greater than the threshold value, the image processor is configured to reset an initial grayscale level of each sub-pixel other than the blue sub-pixel in the pixel in the at least a portion based on the first correction scheme;
when the average grayscale value is smaller than or equal to the threshold value, the image processor is configured to reset an initial grayscale level of a blue sub-pixel in the pixel in the at least a portion based on the second correction scheme.

6. The image processing apparatus of claim 4, wherein the grayscale level corrector comprises a luminance meter configured to measure at least a maximum brightness of a blue sub-pixel by applying a maximum grayscale voltage to the display panel with the added blue-light filter and an analyzer configured to determine the measured maximum brightness to be equal to a brightness corresponding to a grayscale level p of the set of N original grayscale levels of the blue sub-pixel of the display panel without the added blue-light filter, the grayscale level p being set as the threshold value used by the image processor; and
the analyzer further is configured to calculate a transmittance of the blue-light filter determined by a ratio of the measured maximum brightness with the added blue-light filter over an original maximum brightness without the added blue-light filter, and to determine each grayscale level of the first set of corrected grayscale levels to be an integer obtained by rounding up a product value of the transmittance and each of the original grayscale levels from 0 to N−1.

7. The image processing apparatus of claim 4, wherein the grayscale level corrector comprises a luminance meter configured to measure at least a maximum brightness of a blue sub-pixel by applying a maximum grayscale voltage to the display panel with the added blue-light filter and an analyzer configured to determine the measured maximum brightness to be equal to a brightness corresponding to a grayscale level p of the set of N original grayscale levels of the blue sub-pixel of the display panel without the added blue-light filter, the grayscale level p being set as the threshold value used by the image processor; and
the luminance meter further is configured to measure each reduced brightness level of the blue sub-pixel of the display panel with the added blue-light filter by applying 0 to the maximum grayscale voltage corresponding to the N original grayscale levels from 0 to N−1 of the blue sub-pixel without the added blue-light filter, and the analyzer is further configured to determine each grayscale level of the second set of corrected grayscale levels to be an original grayscale level of the blue sub-pixel having an original brightness level matched with a reduced brightness level of the blue sub-pixel with the added blue-light filter, or is assigned to a nearest adjacent corrected grayscale level if the reduced brightness level has no matched original brightness level.

8. The image processing apparatus of claim 1, further comprising an image divider configured to divide the cache image to a plurality of portions.

9. The image processing apparatus of claim 8, wherein the image divider comprises an analyzer configured to determine regional color distribution of the cache image read from the cache memory, to divide the cache image into the plurality of portions with different primary colors, and to output respective portions of the cache image to the image processor.

10. The image processing apparatus of claim 8, wherein the image divider comprises an analyzer configured to determine a size of a screen area in rectangular shape of the display panel, to uniformly divide a width of the screen area to m parts and a length of the screen area to n parts to form m×n first portions, and to output respective cache data of the image within the m×n first portions to the image processor, where m and n are positive integers.

11. The image processing apparatus of claim 10, wherein the m×n first portions comprise a middle portion having j×k first portions, wherein the analyzer is further divide the middle portion to s×d second portions, and to output respective data of the cache image within the m×n first portions and further respective data of the cache image within the s×d second portions to the image processor, where m, n, j, k, s, and d are positive integers and m>j, s>j, n>k, d>k.

12. The image processing apparatus of claim 1, wherein the grayscale level corrector comprises a luminance meter configured to measure at least a maximum brightness of a blue sub-pixel by applying a maximum grayscale voltage to the display panel with the added blue-light filter and an analyzer configured to determine the measured maximum brightness to be equal to a brightness corresponding to a grayscale level p of the set of N original grayscale levels of the blue sub-pixel of the display panel without the added blue-light filter, the grayscale level p being set as the threshold value used by the image processor.

13. The image processing apparatus of claim 1, wherein the N is an integer selected from 16 for 4 bits per sampled pixel, or 256 for 8 bits per sampled pixel, or 65236 for 16 bits per sampled pixel, wherein the minimum brightness level 0 represents total absence of light or black and the maximum brightness level N−1 represents total presence of light or white.

14. A display apparatus comprises a display panel coupled to a blue-light filter and an image processing apparatus of claim 1.

15. A method for correcting color-shift in a displayed image due to brightness change of blue sub-pixels of a display panel with an added blue-light filter configured to filter blue light, the method comprising:
storing a cache image to be displayed at a current time in a cache memory, the cache image comprising initial grayscale levels corresponding to respective brightness of a plurality of sub-pixels in a pixel;
generating a set of N corrected grayscale levels of brightness of a blue sub-pixel for a correction scheme, the set of N corrected grayscale levels respectively one-to-one corresponding to a set of N original grayscale levels from a minimum 0 sequentially up to a maximum N−1 of the blue sub-pixel of the display panel without the added blue-light filter; resetting an initial grayscale levels of at least one sub-pixel in the pixel to a reset grayscale level; and
outputting a grayscale voltage based on the reset grayscale level for driving the at least one sub-pixel of the pixel in the display panel for displaying a corrected image.

16. The method of claim 15, further comprising:
processing at least a portion of the cache image to calculate an average grayscale value of the initial grayscale levels of the blue sub-pixels in the at least a portion;
resetting an initial grayscale level of each sub-pixel other than the blue sub-pixel in the pixel in the at least a portion based on the correction scheme when the average grayscale value is greater than a threshold value, and
outputting the grayscale voltage for each subpixel other than the blue sub-pixel based on the reset grayscale level for driving each subpixel other than the blue sub-pixel in the pixel in the display panel for displaying a corrected image.

17. The method of claim 15, further comprising:
processing at least a portion of the cache image to calculate an average grayscale value of the initial grayscale levels of the blue sub-pixels in each one of the one or more portions;
resetting an initial grayscale level of a blue sub-pixel in the pixel in the at least a portion based on the correction scheme when the average grayscale value is smaller than or equal to a threshold value; and
outputting the grayscale voltage for the blue subpixel based on the reset grayscale level for driving blue sub-pixel in the pixel in the display panel for displaying a corrected image.

18. The method of claim 15, further comprising:
generating a first set of N corrected grayscale levels of brightness of a blue sub-pixel for a first correction scheme, and a second set of N corrected grayscale levels of brightness of a blue sub-pixel for a second correction scheme, the second correction scheme being different from the first correction scheme;
processing at least a portion of the cache image to calculate an average grayscale value of the initial grayscale levels of the blue sub-pixels in the at least a portion;
resetting an initial grayscale level of at least one sub-pixel in the pixel in the at least a portion based on the first correction scheme when the average grayscale value is greater than a threshold value, resetting an initial grayscale level of at least one sub-pixel in the pixel in the at least a portion based on the second correction scheme when the average grayscale value is smaller than or equal to the threshold value; and
outputting the grayscale voltage for at least one sub-pixel based on the reset grayscale level for driving the at least one subpixel in the pixel in the display panel for displaying a corrected image.

19. The method of claim 18, comprising resetting an initial grayscale level of each sub-pixel other than the blue sub-pixel in the pixel in the at least a portion based on the first correction scheme when the average grayscale value is greater than the threshold value; resetting an initial grayscale level of a blue sub-pixel in the pixel in the at least a portion based on the second correction scheme when the average grayscale value is smaller than or equal to the threshold value.

20. The method of claim 18, wherein the threshold value is determined by measuring at least a maximum brightness of the blue sub-pixel driven by a highest grayscale voltage applied to a blue sub-pixel of the display panel with the added blue-light filter, matching the maximum brightness to a brightness of the blue sub-pixel driven by a voltage corresponding to an original grayscale level p (p<N) without the added blue-light filter, determining the threshold value to be equal to p, wherein the transmittance is obtained by taking a ratio of the maximum brightness of the blue sub-pixel driven by the highest grayscale voltage applied to a blue sub-pixel of the display panel with and without the added blue-light filter.

* * * * *